March 11, 1969 T. HOLTWIJK 3,432,832

MAGNETORESISTIVE READOUT OF THIN FILM MEMORIES

Filed Feb. 24, 1965

INVENTOR.
THEODOOR HOLTWIJK
BY
Frank R. Trifari
AGENT

United States Patent Office 3,432,832
Patented Mar. 11, 1969

3,432,832

MAGNETORESISTIVE READOUT OF THIN FILM MEMORIES

Theodoor Holtwijk Emmasingel, Eindhoven, Netherlands, assignor to North American Philips Company, Inc., New York, N.Y., a corporation of Delaware Filed Feb. 24, 1965, Ser. No. 434,898
Claims priority, application Netherlands, Feb. 26, 1964, 6401805
U.S. Cl. 340—174 3 Claims
Int. Cl. G11b 5/62

ABSTRACT OF THE DISCLOSURE

A thin film magnetoresistive device having a bias field which is applied in a direction opposite that of a readout field for increasing the rotational distance through which the internal magnetic vector swings upon application of a readout field, thereby increasing the change in impedance of the film during readout.

This invention pertains to memory or storage elements. It relates in particular to such elements which comprise a thin film or layer of conductive magnetic material having a rectangular hysteresis loop and a preferential direction of magnetization in the plane of the film.

In copending application Ser. No. 151,618, filed Nov. 13, 1961, assigned to the assignee of the instant application, means are disclosed whereby the magnetoresistance of such thin films may be utilized to provide readout of their stored memory condition. Briefly, in accordance with the disclosure in the copending application, two oppositely located conductive connections are provided at the edge of the film for conduction of a current through the film from one connection to the other in a direction lying between the preferential direction of magnetization and a direction perpendicular thereto. The film is also magnetically coupled to at least one conductor, a reading current pulse flowing through the conductor causing a magnetic reading field in the film in a direction perpendicular to the preferential direction. The film is connected by means of the conductive connections into a current circuit in which a direct current is maintained during reading, the current circuit being coupled to a detecting device for detecting variations in resistance occurring therein due to the application of the reading field. The resistance variations are of one polarity if the film was previously set in one remanence state and of a polarity opposite thereto if the film had previously been set in its other remanence state. Among the advantages of magnetoresistive readout are: the output signal is independent of the dimensions of the memory element, thus allowing the element to be made as small as is mechanically practicable, and the output signal is independent of switching speed.

It is a primary object of the invention to provide means for magnetoresistive readout of thin film memory elements wherein an output signal of relatively large amplitude may be obtained and in which the output signal is independent to a considerable degree of any differences existing between the actual direction of preferential magnetization and the desired direction of preferential magnetization.

Briefly, in accordance with the invention, a thin film of the type described is inductively coupled to a premagnetizing conductor through which a premagnetizing current flows prior to the start time of the reading current pulse; the premagnetizing current causes a premagnetization field in the film in a direction opposite to the direction of the reading field caused by the reading current.

Figure 1:
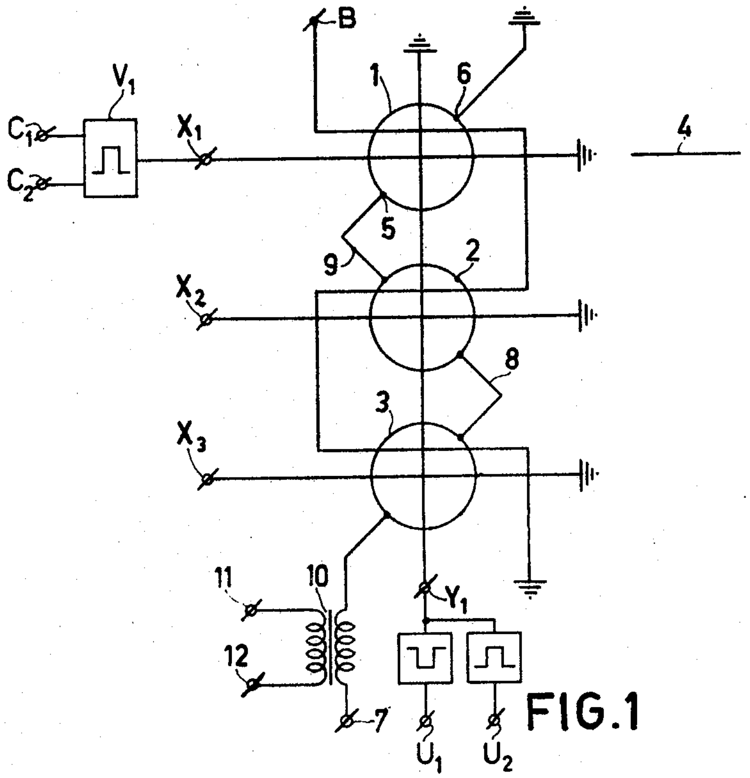
Figure 2B:
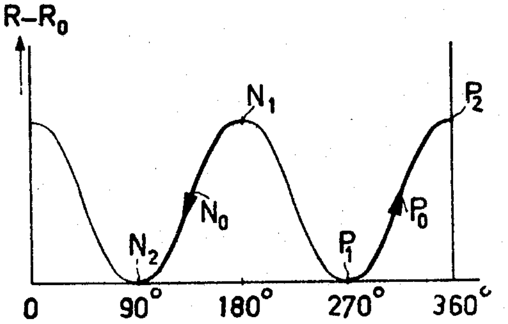
Figure 2A:
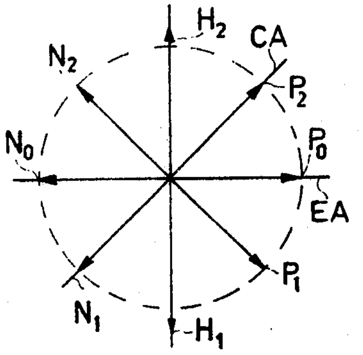

In order that the invention may be readily carried into effect, it will now be described in detail, for example, with reference to the accompanying drawing, in which:

FIG. 1 is a schematic circuit diagram of one embodiment of a memory device provided with memory elements according to the invention;

FIG. 2*a* is a graphical illustration of the relative directions of various magnetic fields and currents of a memory element; and FIG. 2*b* is a graphical illustration of the magnetoresistance effect.

The memory device of FIGURE 1 comprises memory elements 1, 2, 3 each constituted by a thin layer of conductive magnetic material with uni-axial anisotropy, for example, a Ni-Fe alloy of approximately 1000 A. thick and 1 mm. diameter. Each store element has a preferred direction of magnetization which, as is common practice, is referred to hereinafter as the easy direction and shown by the horizontal piece of line 4 to the right of the store element 1. The direction at right angles to the preferred direction, vertical in the figure, is referred to hereinafter, as is common practice, as the difficult direction. In order to describe the operation of a store element, the thin layer may be regarded as a magnetic dipole which may be represented by a magnetization vector located in the plane of the thin layer. In the absence of an externally applied magnetic field the axis of the magnetization lies in the easy direction prescribed by the uni-axial anisotropy. The two stable positions of the store element, to which the numbers 0 and 1 are assigned, are the two anti-parallel directions of the magnetization vector in relation to the preferred direction.

Each of the store elements 1, 2 and 3 is magnetically coupled to an associated X-conductor, indicated by X1, X2 and X3 respectively, and to a common Y-conductor Y1. Each X-conductor extends in parallel with the easy direction and a current flowing through the conductor produces a magnetic field in the difficult direction in the thin layer. The Y-conductor, which is at right angles to the X-conductors and insulated therefrom, extends in parallel with the difficult direction and a current flowing through the Y-conductor causes a magnetic field in the easy direction. Each X-conductor has associated with it a pulse generator V1 and two control terminals $C_1$ and $C_2$, the terminal $C_1$ being used for writing information and the terminal $C_2$ for reading. The Y-conductor is coupled to two pulse generators which can supply relatively weak pulses of opposite polarities as shown, and control terminals $U_1$ and $U_2$. The generator associated with terminal $U_1$ may be used for supplying the information 0 and the generator associated with terminal $U_2$ for supplying the information 1. In each store element two opposite conductive connections are provided at the edge of the thin layer. These connections are designated 5 and 6 for the store element 1. The store elements 1, 2 and 3 are included in series-combination via the said conductive connections in a current circuit which extends from a terminal 7 to earth through intermediate conductors 8 and 9. A voltage is applied to terminal 7 and maintains a direct current in said current circuit. The direction from connection 5 to connection 6 lies midway between the easy and difficult directions of magnetization and the direction of the current flowing through each store element makes an angle of 45° with the easy direction.

During writing of the number 1 or the number (0) in a store element a writing current pulse is applied to the associated X-conductor with a strength such that the magnetization vector, irrespective of its initial position, is adjusted in the difficult direction by the writing field. Further an information current pulse is applied to the Y-conductor having an amplitude much smaller than that of the X pulse and which begins later and also ends later than the X pulse. The Y pulse, which may at will have positive or negative polarity, determines to which of the two stable positions the magnetization vector returns after termination of the X pulse.

To determine the position of a store element, a reading current pulse is applied to the associated X-conductor with a strength such that the magnetization vector turns through an angle of approximately 45° towards the difficult direction. The direction of rotation of the magnetization vector which occupied the 0-position is then opposite to the direction of rotation to the magnetization vector which occupied the 1-position. In one case the rotated magnetization vector coincides with the direction of the current and in the other case the rotated magnetization vector is at right angles to the direction of the current. The D.C. resistance of the thin layer is dependent upon the angle made by the magnetization vector and the direction of the current and is maximum if the two directions are coincident and is minimum if the two directions are at right angles to one another. In both the 0-position and the 1-position of a store element the magnetization factor makes an angle of 45° with the direction of the current and the resistance is the same for both positions of the store element. During reading, the resistance increases or decreases according as the store element occupies one position or the other, the primary 0- and 1-output signals being oppositely equal variations in resistance. The current circuit from terminal 7 to earth includes a primary winding of a transformer 10 which converts the positive and negative resistance variations in the current circuit into pulses of opposite polarity between terminals 11 and 12 of the secondary winding. The said pulses are applied to a reading amplifier (not shown). On termination of the reading current pulse the magnetization vector returns to the original direction so that the information is not lost and may be read again.

In order to increase the primary output signals of the store elements, the latter are magnetically coupled to a common conductor B which extends in parallel with the easy direction of magnetization for each store element. A premagnetizing current is supplied to the B-conductor and produces in each store element a premagnetization field in the difficult direction of a strength such that the two stable positions of the magnetization vector make an angle of approximately 45° with the easy direction. The direction of the premagnetization field in each store element is opposite to the direction of the reading field produced by a reading current pulse. This is clarified in FIGURE 2*a*. In this figure the easy direction of magnetization and the direction of the current are indicated by EA and CA respectively. In the absence of an externally applied magnetic field the magnetization vector has the stable positions indicated by P0 and N0, and in the presence of a premagnetization field H1 the magnetization vector has the stable positions indicated by P1 and N1. In position P1 the magnetization vector is at right angles to the direction of the current and the resistance of the store element is minimum, whereas in position N1 the magnetization vector extends in parallel with the direction of the current and the resistance is maximum. In order to determine the position of a store element, a reading current pulse is applied to the associated X-conductor with a strength such that the resulting reading field H2 is oppositely equal to the premagnetization field H1. In the presence of the reading field the magnetization vector has the stable positions indicated by P2 and M2 and, due to the application of the said reading field, the magnetization vector rotates through an angle of 90° from position P1 to position P2 or from position N1 to position N2. In the former case the resistance of the store element increases from the minimum value to the maximum value and in the latter case the resistance decreases from the maximum value to the minimum value. In the absence of the premagnetization field H1 and for a reading field having a strength equal to that of the field H2, the magnetization vector rotates from position P0 to position P2 or from position N0 to position N2. The resistance variations occurring in the presence of a premagnetization field thus are twice as great as is the case without the use of a premagnetization field. FIGURE 2*b* shows the resistance of a store element in the form of a resistance curve as a function of the angle between the magnetization vector and the direction of the current, the difference between the resistance R of the store element and the minimum value R0 thereof being plotted along the vertical axis. The resistance curve has a sinusoidal variation and may be represented in a formula by:

$R-R0=R1(1+\cos 2\varphi)$, where $\varphi$ is the angle between the direction of the current and the direction of magnetization and R1 is a constant. In this figure, the points corresponding to the positions of the magnetization vector shown in FIGURE 2*a* are indicated by the same reference numerals as in FIGURE 2*a*. In the absence of an externally applied magnetic field P0 and N0 are the two stable points and, when using a premagnetization field, they change to the stable points P1 and N1. During the reading field N2 and P2 are the two stable points. The portions of the resistance curve traversed after the application of the reading field are indicated by thick lines between the points N1 and N2 and between the points P1 and P2.

If the angle between the direction of the current and the easy direction of magnetization differs from 45°, asymmetry occurs between the 0- and 1-output signals of a store element without the use of the premagnetization field. This asymmetry may be illustrated with reference to FIGURE 2*b*. In the absence of the premagnetization field the primary 0-output signal is the difference in resistance between the points N0 and N2 and the primary 1-output signal is the difference in resistance between the points P0 and P2. A small deviation from the desired value of 45° between the direction of the current and the easy direction becomes manifest in the figure by a displacement of the points N0 and N2 and the points P0 and P2 along the resistance curve in the same direction and through the same angle. Upon displacement of point N0 in the downward direction the difference in resistance between the points N0 and N2 decreases and upon downward displacement of point P0 the difference in resistance between the points P0 and P2 increases so that the 1-output signal has increased at the expanse of the 0-output signal. The reverse is the case upon displacement in the other direction. This asymmetry does not occur if the premagnetization field is used, which is illustrated in an analogous manner with reference to FIGURE 2*b*. In the presence of the premagnetization field the 0-output signal is the difference in resistance between the points N1 and N2 and the 1-output signal is the difference in resistance between the points P1 and P2, these differences in resistance remaining equal to one another upon displacements of the points N1 and N2 and of the points P1 and P2. This symmetry of the output signals is retained independently of the value of the premagnetization field if the total reading field is invariably oppositely equal to the premagnetization field.

For rotating the magnetization vector towards the difficult direction through an angle of 45° a magnetic field in the difficult direction is needed having a strength of 0.7 Hk where Hk is the anisotropy field. In practice it has been found that a magnetic field in the difficult direction having a strength greater than 0.6 Hk may give rise to a permanent variation in magnetization of a portion of the thin layer and it is therefore preferable for the premagnetization field to be made not greater than 0.6 Hk.

The premagnetization field need not be switched off during writing if the value of the field is chosen to be such that the premagnetization field, together with the field caused by a Y pulse, does not result in permanent variation in the magnetization of the store element. Thus it may be necessary to give the premagnetization field a value of, for example, 0.4 Hk. If the premagnetization field is switched on only during reading it is possible to choose the higher value of 0.6 Hk.

What is claimed is:

1. A memory element comprising a thin film composed of a conductive magnetic material having a substantially rectangular hysteresis curve with a preferential orientation of magnetization in the plane of the film, means for determining the magnetization condition of the element comprising first means inductively coupled to said thin film for setting up a first magnetic field co-acting with said thin film, second means inductively coupled to said thin film for setting up a second magnetic field co-acting with said thin film, said second field having a magnetization vector substantially opposite in direction to that of said first field, a source of power, and electrically conductive means conductively connected to said thin film and electrically conductively interconnecting said thin film and said source of power for detecting the change of current flow through said memory element due to the setting up of said magnetic fields.

2. A storage element comprising a thin film composed of a conductive magnetic material having a substantially rectangular hysteresis curve with a preferential orientation of magnetization in the plane of the film, means inductively coupled to said element for storing information therein along said preferential orientation, means for determining the condition of the element comprising first means inductively coupled to said thin film for setting up a first magnetic field co-acting with said thin film and having a direction substantially perpendicular to said preferential orientation and second means inductively coupled to said thin film for setting up a second magnetic field co-acting with said thin film and having a direction substantially perpendicular to said preferential orientation and opposite to the first magnetic field, a source of power, and electrically conductive means conductively connected to said thin film and electrically conductively interconnecting said thin film and said source of power for detecting the change of current flow through said memory element due to the setting up of said magnetic field.

3. A memory system comprising: a thin film composed of a conductive magnetic material having a substantially rectangular hysteresis curve with a preferential orientation of magnetization in the plane of the film, first means inductively coupled to said element, means for applying input information to said inductive coupling to change the magnetization condition of said element corresponding to said input information, means for detecting the storage condition of said film comprising means inductively coupled to said film for setting up first and second magnetic fields coacting with said film, said first and second magnetic fields having magnetization vectors whose directions are substantially 180° apart, a source of power, and electrically conductive means conductively connected to said film and electrically conductively interconnecting said thin film and said source of power for detecting the change of current flow through said thin film.

References Cited

UNITED STATES PATENTS 3,095,555 6/1963 Moore ---------- 340—174
3,218,616 11/1965 Huijer et al. -------- 340—174
3,252,152 5/1966 Davis et al. -------- 340—174

FOREIGN PATENTS 249,420 5/1963 Australia.

BERNARD KONICK, *Primary Examiner.*

JOSEPH F. BREIMAYER, *Assistant Examiner.*